United States Patent [19]
Okajima et al.

[11] 4,439,018
[45] Mar. 27, 1984

[54] ZOOM LENS STRUCTURE

[75] Inventors: Hidekazu Okajima, Tokyo; Sadahiko Tsuji, Kanagawa, both of Japan

[73] Assignee: Canon Kabushiki Kaisha, Japan

[21] Appl. No.: 291,036

[22] Filed: Aug. 7, 1981

[30] Foreign Application Priority Data

Aug. 22, 1980 [JP] Japan .................. 55-115417

[51] Int. Cl.³ .................. G02B 7/10; G02B 15/18
[52] U.S. Cl. .................................................. 350/430
[58] Field of Search .......................... 350/429, 430

[56] References Cited
U.S. PATENT DOCUMENTS 4,324,457 4/1982 Tomori ................... 350/430

Primary Examiner—Jon W. Henry
Attorney, Agent, or Firm—Toren, McGeady and Stanger

[57] ABSTRACT

In the disclosed zoom lens structure, the zoom system forms an optical axis and includes a focusing lens group, a variator lens group, and an image forming lens group. A cam arrangement serves for moving the focusing lens group along the optical axis while a zooming arrangement serves to displace the variator lens group along the optical axis to adjust the focal length of the system. A compensating arrangement rotates the focusing lens group while simultaneously moving it together with the variator lens group along the optical axis to compensate the focusing of the system. In one embodiment, the cam arrangement forms a first cam range for focusing in a normal range and a second cam range for macrofocusing. Here, the zooming arrangement defines a predetermined variator operating range and a predetermined macrophotography position with the variator lens group and the focusing lens group connected to each other only in the macrophotography position to move along the optical axis in the second cam range.

5 Claims, 13 Drawing Figures

ZOOM LENS STRUCTURE

FIELD OF THE INVENTION

The present invention relates to a zoom lens structure capable of the macrophotographing.

BACKGROUND OF THE INVENTION

Various kinds of macrophotography arrangements have been proposed for adjusting the focusing of zoom lenses in the normal and macrophotography ranges. In the normal photography range, the focusing lens group is displaced for focusing, while in the macrophotography range, all of the focusing, variator, compensator, and image forming lens groups are displaced along the optical axis to focus. Such arrangements are mechanically complicated because so many groups must be adjusted for zooming and focusing.

SUMMARY OF THE INVENTION

It is an object of the invention to provide a zoom lens of simple construction and capable of macrophotography, wherein the number of movable elements is reduced to a minimum.

An afocal zoom system having a positive and a negative, and a positive or a negative, a positive, and a negative refractive power from the object end, the focal point displacement can be compensated for either with the third lens or the first lens group when the second lens group has a variator or variation effect. The terms variator and variation are used herein interchangeably.

Consequently, when the first group is used as the compensating optical element and focusing is carried out in the normal photography range, the number of movable elements can be reduced to two. Moreover, when the first and second groups are used for focusing in the macrophotography range, smaller numbers of movable elements can be used to obtain the same effects as in conventional zoom lenses.

The present invention has been made in view of the above conception, whereby in the normal photographing range the focusing optical element is displaced along the direction of the optical axis by means of the distance adjusting means so as to bring the object into focus and the variation optical element is displaced in operative engagement of the focusing optical element so as to carry out the variation and the compensation of the focal point displacement. On the other hand in case of the macrophotographing the variation optical element and the focusing optical element can be at the same time displaced into a certain determined position by means of the afore mentioned focal length adjusting means.

Below the present invention will be explained in detail in accordance with the accompanying drawings of the embodiment thereof.

DETAILED DESCRIPTION OF THE PREFERRED EMBODIMENTS

Figure 1B:
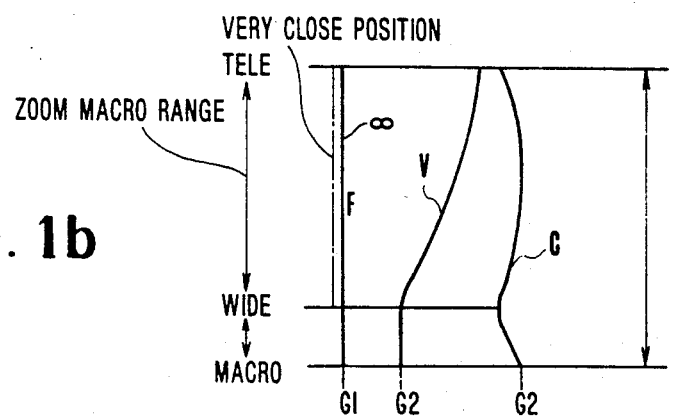
FIGS. 1(b) and 1(c) illustrate more movements of the components in FIG. 1(a).
Figure 1A:
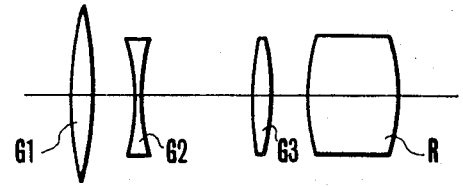
FIG. 1(a) shows the arrangement of the zoom lens to which the present invention is to be applied.

The difference between the displacement of the lens in accordance with the present invention and a conventional one is explained below in accordance with FIG. 1 with FIG. 1(a) as well as FIGS. 1(b) and 1(c).

In a conventional zoom lens having an afocal system consisting of a lens $G_1$ with a positive refraction power, lens $G_2$ with a negative refractive power and $G_3$ lens with a positive refractive power, lens $G_1$ is used as a focusing lens, $G_2$ as a variation lens and $G_3$ as a compensation lens. The focusing lens which is movably held by a conventional helicoid mechanism and the like is displaced from the ∞ position to the very close position shown in FIG. 1(b) within the zooming range by rotating the lens distance adjusting ring for focusing. The variation lens $G_2$ and the compensation lens $G_3$ are respectively displaced along the curve V respectively C from the end at the telephoto side to the end at the wide angle side along with the rotation of the cam ring operatively engaged with the zoom ring so as to carry out the variation and the compensation at the same time. For macrophotography rotating the lens' zoom ring up to the macro position displaces the compensation lens $G_3$ further along the prolongation of the curve C. Lens R is a relay lens.

On the other hand in a zoom lens in accordance with the present invention, lens $G_1$ is for focusing and compensation, while lens $G_2$ is for variation, and $G_3$ is fixed.

Figure 1C:
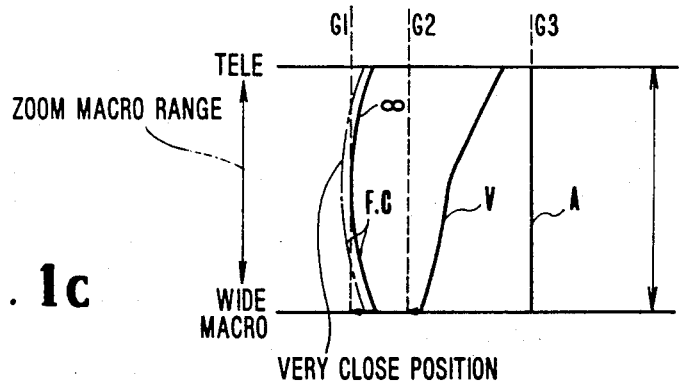

The displacement of the lenses $G_1$ and $G_2$ in this case is shown in FIG. 1(c). When the distance adjusting ring is rotated within the zooming range, the focusing lens $G_1$ is displaced from the ∞ position to the very close position. When the zoom ring is operated the variation lens $G_2$ is displaced along the curve V from the telephoto end to the wide angle end along with the rotation of a cam ring, while the focusing lens $G_1$ displaced from the telephoto end to the wide angle end parallel to the curves F and C so as to carry out the variation and the compensation. Further for photography the zoom ring is rotated up to the wide angle end and then lenses $G_1$ and $G_2$ are displaced into a predetermined position by other means. A numerical example of the above-mentioned optics to which the present invention follows:

NUMERICAL EXAMPLE 1

| fw = 10 | fM = 20 | fT = 40 | |
|---|---|---|---|
| $f_1$ = 40 | $e_1w$ = 10 | $e_1M$ = 20 | $e_1T$ = 25 |
| $f_2$ = −10 | $e_2w$ = 25 | $e_2M$ = 20 | $e_2T$ = 10 |
| $f_3$ = 40 | $e_3w$ = 10 | $e_3M$ = 10 | $e_3T$ = 10 |
| $f_4$ = 20 | | | |

Where $f_i$ is the focal length of the i-th group from the object.

$e_i$ is the i-th distance between the principal point from the object.

When in the above optics, the first group is advanced 1.3 mm in order to bring the object about 1.2 m distance in focus, $e_1w$=b 11.3, $e_1M$=21.3 and $e_1T$=26.3. Now the first and the second groups are advanced 5 mm at the wide angle side for distance adjustment in the macrophotography range, the object is at 40 mm distance before the first group can be brought into focus.

FIGS. 2 to 5 show the zoom lens in accordance with the present invention applied to the motion picture camera having an automatic focusing device.

Figure 2:
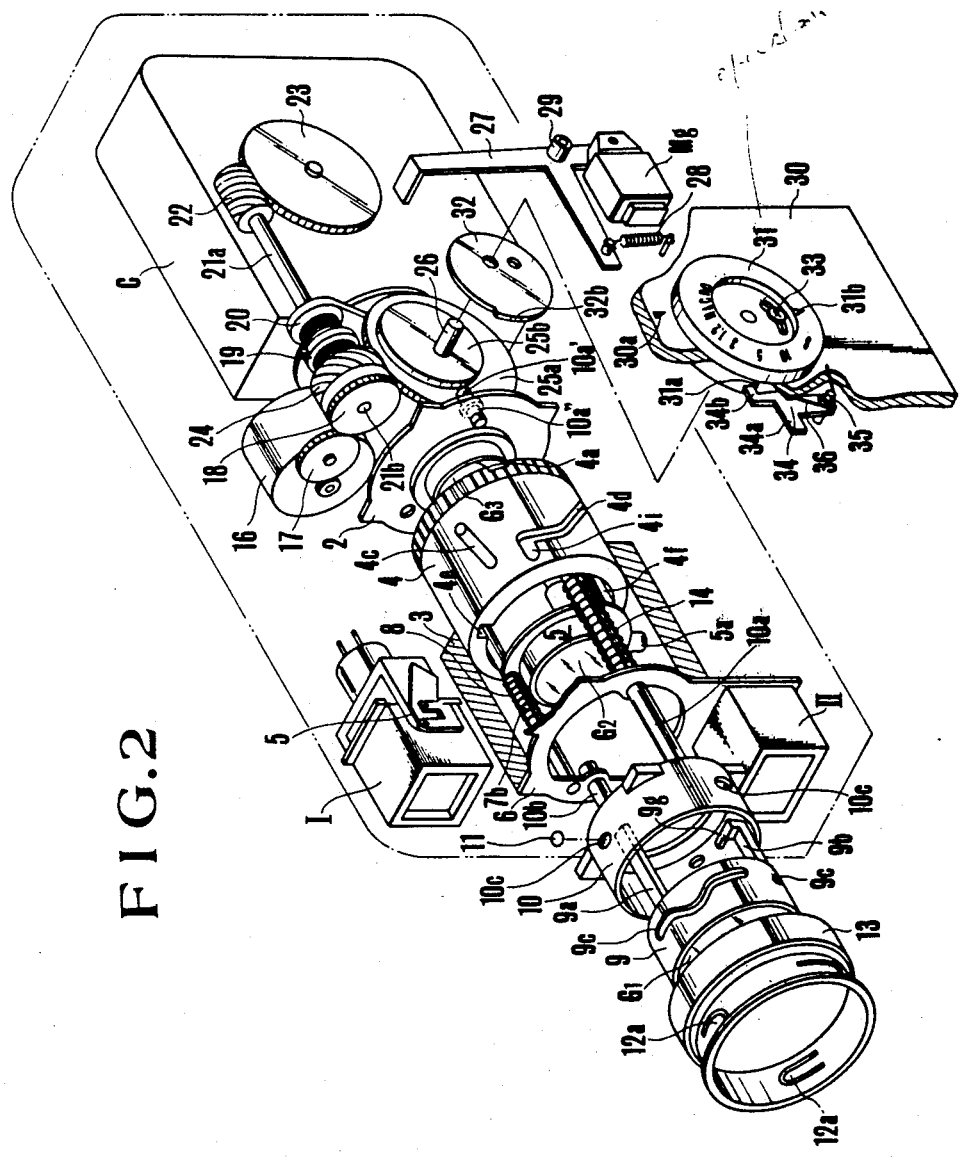
FIG. 2 shows an embodiment of the present invention in perspective view.

FIG. 2 includes a camera body 1, a lens base plate 2 secured on the body 1, a lens barrel 3 fixed on the lens base plate 2 and shown in section and a front base plate 6 secured at the front end of the lens barrel. A cam ring 4 has a zoom operation lever 4C, and is rotatably mounted in the above-mentioned secured lens barrel 3 and prevented from the displacement toward the optical axis by means of the base plates 2 and 6. A displacement ring 5 holds the variations lens $G_2$, and is guided so as to be displaced along the optical axis by means of the guide bars 7a and 7b which are held with the base plates 3 and 6. A pin 5a provided on the ring 5 engages a cam groove 4d of the cam ring 5a. A spring 8 serves for urging the displacement ring 5 backwards. Member 10 is a front lens barrel, on which direct advance bars 10a and 10b to be engaged in the guide holes in the base plates 3 and 6 and in which the holding cylinder 9 for holding the focusing lens $G_1$ is rotatably engaged. The bar 10a is urged backwards by means of the spring 14 which pushes a collar 15 (shown in FIG. 3) locked in a circular groove near the end of the bar 10; the back-end 10a' of the direct advance bar 10 is in contact with the focusing cam 25 to be explained later.

The front lens barrel 10 is provided with three holes on the external circumference, while the holding cylinder 9 is provided with three V-shaped cam grooves 9c, in which the steel ball 11 entering into a hole 10c is engaged and pressed by means of the flexible portion 12a of the spring 12 engaged into the lens barrel 10.

A ring 13 engages a ring 12 so as to restrict the excessive deformation of the above-mentioned flexible portion.

Secured to the back-end of the holding cylinder 9 are direct advance keys 9a and 9b to be engaged in the key grooves 4e and 4f inside of the above-mentioned cam ring 4. Rotation of the cam ring 4 rotates the holding cylinder 9 so as to displace the latter along the optical axis due to the cam groove 9c.

At the back end of the key groove 9b, a bent portion 9g is engageable with a pin 5b (FIG. 5) provided on the above-mentioned displacement ring 5 is engageable.

A light projector block I of the automatic focusing device and a light receiver block II are mounted on the base plate 6. A driving motor 16 rotates the shaft 21b through the gear 17 and 18 so as to selectively drive the gear 20 and the worm 24 through the clutch 19. The gear 20 drives a conventional shutter blade, the film feeding claw and the winding shaft in the cartridge through the shaft 21a, the worm 22 and the worm wheel 23 constituting one body. Further, a worm 24 engages a worm wheel 25a so as to rotate the focusing cam 25b around the fixed shaft 26 secured to a wheel 25a. A change lever 27 serves for changing the above-mentioned clutch 19, and is borne on the fixed part of the camera by means of the shaft 29. One arm of the lever 27 holds the armature to be attracted by the magnet Mg. The other arm is urged by means of the spring 28 against the attractive force of the magnet Mg so that in accordance with the excited or the non-excited state of the magnet the clutch is changed to transmit the power of the motor to the focusing cam or to the film feeding mechanism.

An operating knob 31 on the exterior of the camera, has a distance scale for manual focusing and the macro range scale is mounted on the cover 30 at the side of the camera with a cam plate 32 and a screw 33 so as to be rotatable around the above-mentioned fixed shaft 26.

Figure 3:
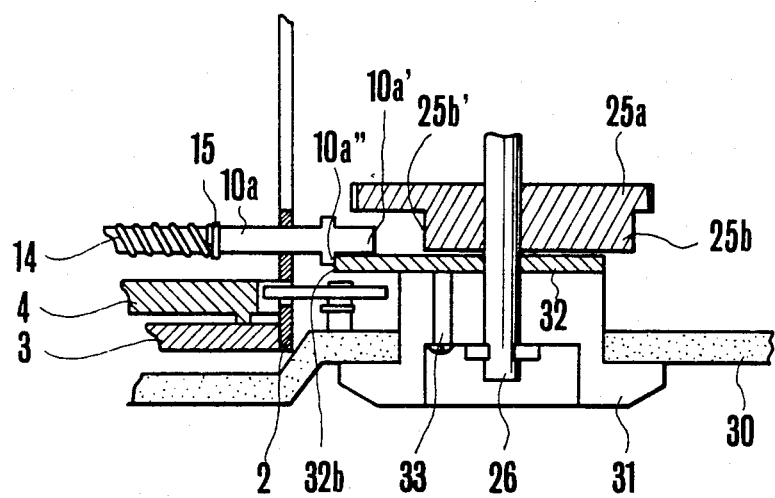
FIG. 3 shown a part in section.

The circumference of the cam plate 32 consists of a cam face having the ordinary photographing distance range in which the cam lift increases gradually from an ∞ distance to a very close distance of 1.2 m and of another cam face having a macrophotographic distance range which follows the above range and in which the cam lift increases. The cam face engages a stepped part 10a" near the back end of the direct advance bar 10a of the front lens barrel. Member 15 shown in FIG. 3 is a horse washer or collar which is engaged in the groove in a direct advance bar 10a, and engages the back end of the spring 14.

Figure 4A:
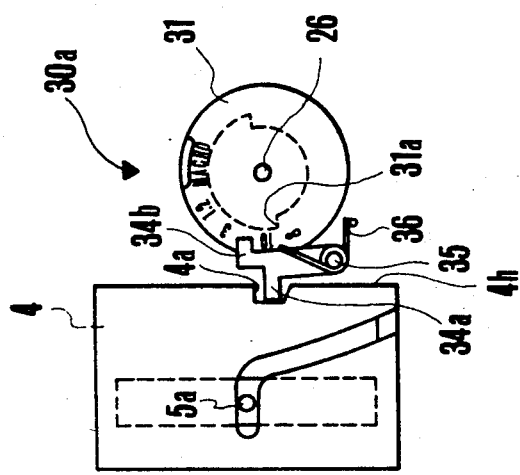
FIGS. 4(a) and 4(b) show the relation among the cam ring, the prevention lever and the operation nob.

A prevention lever 4 rotatable around the shaft 35 is urged counteclockwise by a spring 36 hence, when one arm 34a is engaged with the back end 4h of the cam ring 4 as is shown in FIG. 4(a), the other arm 34b prevents the afore-mentioned operation knob 31 from rotating into the macro position.

In operation, when the aforementioned operation knob 31 in rotated about 180° out of the position shown in FIG. 2 until the auto mark 31b coincides with the index 30a, distance adjustment is made possible with the automatic focusing device.

When the rotation of the motor 16 is transmitted to the worm wheel 25a through the afore-mentioned clutch and the focusing cam 25b secured to the wheel 25a rotates, the straight advance bar 10a in contact with the circumference of the cam 25b is pushed so as to displace the front lens barrel 10 forward against the force of the spring 14. Because at this time the holding cylinder 9 of the focusing lens is positioned and held in the front lens barrel by means of the cam 9c as well as the steel ball 11 and the spring 12a as explained above, the focusing lens moves with the lens barrel 10 so as to carry out the focus adjustment. When a magnet mg is operated by means of the focusing signal from the circuit not shown in the drawing along with the operation of the distance measuring blocks I and Ii the clutch is changed over by means of the change over lever so as to stop the worm wheel 25a. Hence, the focusing lens $G_1$ stops at the position corresponding to the object distance and then the rotation of the motor is transmitted to the shutter and the film feed mechanism so as to start photography.

When the focal length is adjusted independently of the distance adjusting the system operates as follows.

When in this case the zoom lever 4c is operated to rotate the cam ring 4 the displacement ring 5 which engages the cam groove 4d with the pin 5a starts to move straight, guided with the guide bars 7a and 7b. At this time the variation lens $G_2$ is displaced along the optical axis from the telephoto end to the wide angle end along the curve V shown in FIG. 1(b). On the other hand the rotation of the cam ring 4 displaces holding cylinder 9 engaged with the cam ring 4 through the key-groove engagement toward the optical axis by means of the steel ball in the still standing front lens barrel 10 and the cam groove 9c. At this time the focusing lens $G_1$ moves along the curves F.C shown in FIG. 1(b).

In case the distance adjustment is carried out manually, desired between the ∞ distance and the very close distance of 1.2 m is to coincide with the index 30a by rotating the knob 31. The cam plate 32 which is now rotated pushes the stepped part of the straight advance bar with its circumference so that the focusing lens G₁ is displaced toward the optical axis by the cam lift.

At this time the focusing cam 25b for the automatic focusing cam is stopped by the positioning switch provided on the worm wheel 25a but not shown in the drawing at the position at which the cam surface is most distant from the straight advance bar 10a, so that the straight advance bar 10a is controlled by means of the cam plate 32 over the whole range from the ∞ position to the very close position. Also at this time the focal length adjustment has nothing to do with the focusing operation so that the variation from the telephoto and to the wide angle end is possible with the operation of the zoom lever 4c.

Figure 4B:
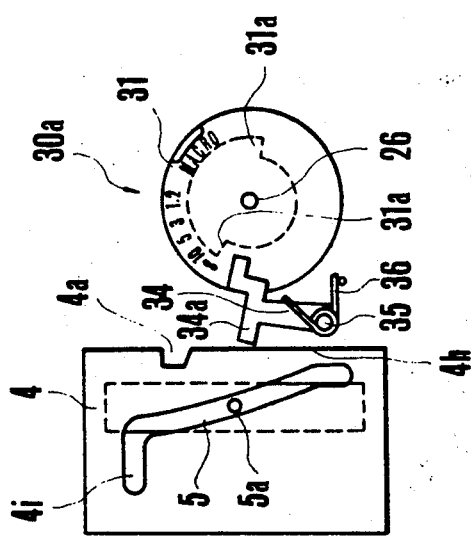
Figure 5:
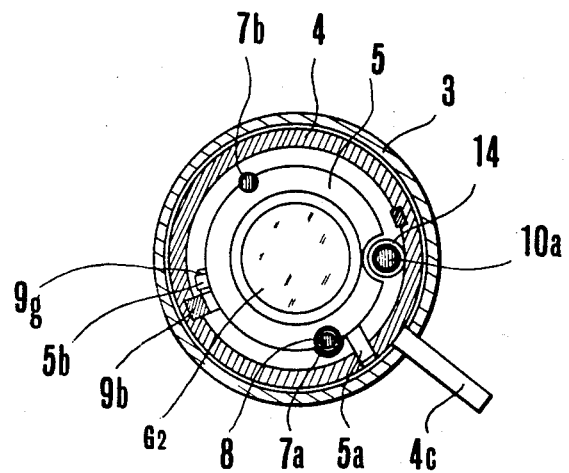
FIG. 5 shows the lens barrel in section.

For macrophotography after having rotated the cam ring 4 up to the wide angle end by means of the zoom lever 4c the operation knob 31 is rotated out of the normal distance scale range into the macrophotography range. As shown in FIG. 4, the knob 31 is provided with a notch 31a, so the prevention arm 34b engages the notch 31a in order to prevent the displacement out of the scale range from the ∞ distance to the very close distance 1.2 m into the macrophotographing range. When the cam ring has rotated up to the wide angle end the arm 34a of the prevention lever 34 engages the notch 4a at the back end of the cam ring, while the other arm 34b is retired out of the rotation path of the stepped part 31a so that the knob 31 can be rotated into the macrophotography range as is shown in FIG. 4(b). Further, in this state the cam ring 4 is prevented from rotating by means of the prevention lever 34a.

When the knob has been rotated into the macrophotography range, the cam plate 32 is also rotated. Hence, the stepped part 10a'' of the straight advance bar 10 is pushed by means of the circumference of the cam plate 34 so as to displace the holding cylinder 9 along the optical axis.

Because at this time the cam ring 4 is at the wide angle side end, the pin 5b on the circumference of the displacement ring 5 is engaged with the bent end 9g of the key of the holding cylinder 9. Hence, the displacement ring 5 is displaced against the force of the spring 8, while the focusing lens G₁ and the variation lens G₂ is displaced by the amount shown by the arrow at the wide angle side end in FIG. 1(e).

Because at the wide angle end the pin 5a of the displacement ring is positioned at the straight portion 4i parallel to the optical axis at the end of the cam end 4d the displacement ring 5 can be advanced without difficulty.

In the above-mentioned example the macrophotography is carried out only at the end of the wide angle range whereby it is also possible to carry out the macrophotographing by displacing the focusing lens and the variation lens at the end of the telephoto range.

Figure 6:
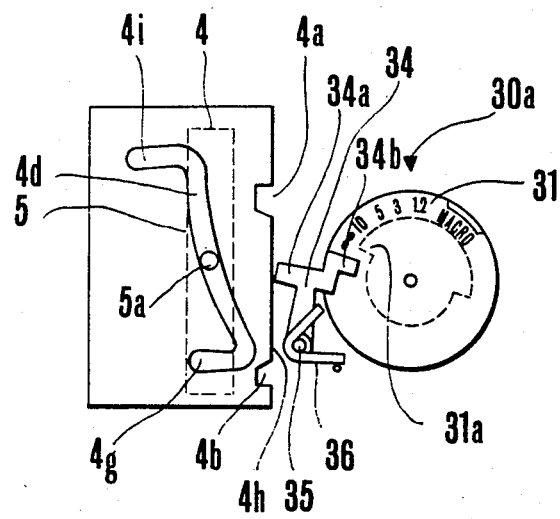
FIG. 6 shows a variation in side view.

A variation of the above embodiment is shown in FIGS. 6 and 7. Two notches 4a and 4b are provided at the back end of the cam ring 4, so the arm 34a of the prevention lever is engaged in the notches at the end of the telephoto range and at the wide angle range. Further, the straight grooves 4a and 4g extending along the optical axis are provided at both ends of the cam groove 4d.

The bent parts 9f and 9g are provided at the back ends of the keys 9a and 9b of the focusing lens holding cylinder, while the pins 4c and 5b are provided on the variation lens displacement ring 5 so as to corresponds to the above bent parts 9f and 9g.

Figure 7A:
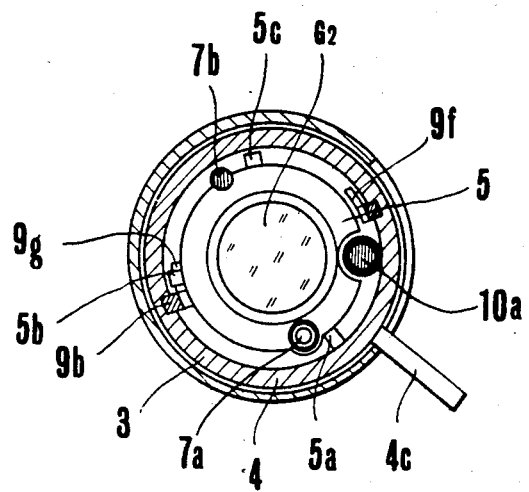
FIGS. 7(a) and 7(b) show the variation in section.
Figure 7B:
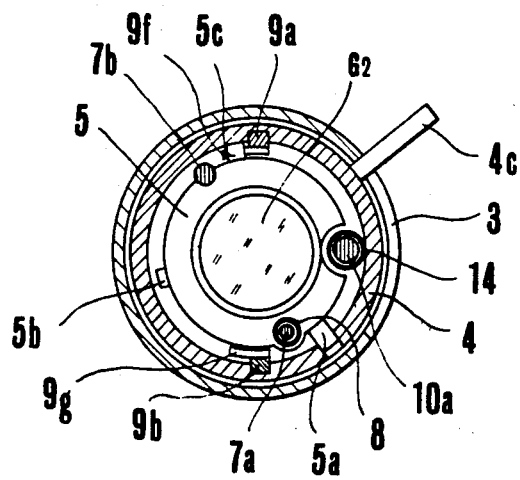

At the end of the wide angle range shown in FIG. 7(a) the pin 5a of the displacement ring 5 is engaged in the straight groove 4i, while the bent part 9g of the key 4b of the holding cylinder engages the pin 5b of the displacement ring. Operation with the operation of the operation knob 31 displaces the focusing lens G₁ and the variation lens G₂ in the same way as in the aforementioned case. When the cam ring 4 has been rotated up to the end of the telephoto range shown in FIG. 7(b) the pin 5b is disengaged from the bent part 9b. Along with the rotation of the operation knob 31 the cam plate 32 pushes the stepped part 10a'' of the straight advance bar so as to advance the holding cylinder 9 and the displacement ring 5. In this case the pin 5a of the displacement ring travels in the straight groove 4g, so that the lenses G₁ and G₂ are displaced up to the macrophotography position.

Below is an example in which the lenses in the afocal optics of the zoom lenses have negative, positive and negative refractive effects.

Figure 8:
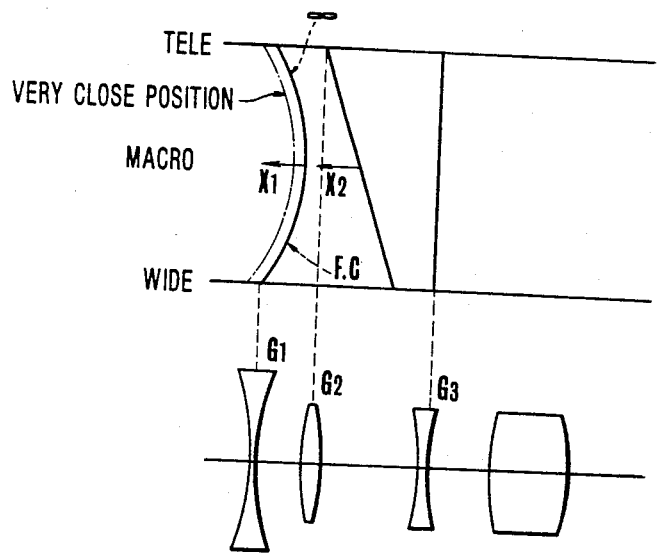
FIG. 8 shows the optical arrangement of the second embodiment.

The zoom lens to which the present example to be applied has the optical arrangement as is shown in FIG. 8 and has the following numerical values.

NUMERICAL EXAMPLE 2

| $f_w = 10$ | $f_M = 20$ | $f_T = 40$ | |
| $f_1 = -20$ | $f_1w = 40$ | $f_1M = 20$ | $e_1T = 10$ |
| $f_2 = 20$ | $f_2w = 10$ | $f_2M = 20$ | $e_2T = 40$ |
| $f_3 = -20$ | $f_3w = 10$ | $f_3M = 10$ | $e_3T = 10$ |
| $f_4 = 20$ | | | |

With the above-mentioned optical arrangement, when first group is advanced 0.3 mm in order to bring an object at about 1.3 m distance in focus, $e_1w = 40.3$, $e_1M = 20.3$ and $e_1T = 10.3$.

As to the distance adjustment in the macrophotography range in the above-mentioned state the first and the second group are advanced 10 mm for an intermediate distance, whereby an object at the 37.4 mm distance before the first group can be brought into focus. In the wide angle range the first and the second group are advanced 5 mm, so an object at a 9.3 mm distance before the first group can be brought into focus.

Figure 9:
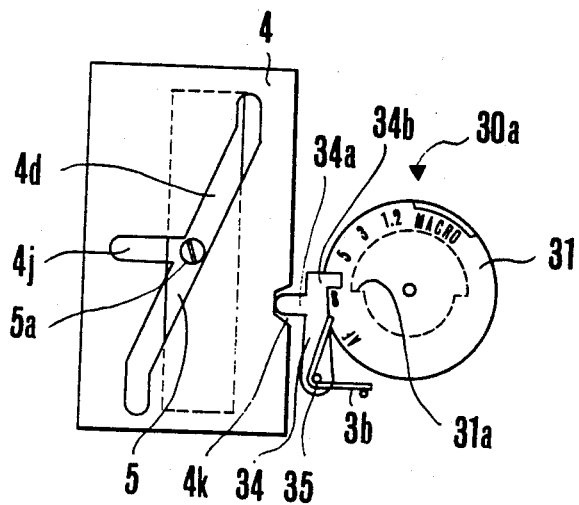
FIG. 9 shows the side view of the cam ring of the second embodiment.

FIG. 9 shows an embodiment by means of which the macrophotography can be performed at an intermediate focal length distance. Here, at almost the middle of the cam groove 4d of the cam ring 4a a straight groove 4j parallel to the optical axis is provided, in such a manner that when the pin 5a of the displacement ring coincides with the groove 4j the arm 34a of the prevention lever engages the notch 4k at the back end of the cam ring so as to make the operation knob rotatable in the macrophotography range.

Also in the same way as shown in FIG. 3 the pin of the displacement ring is engaged with the bent part of the one key of the displacement cylinder 9 in such a manner that when the cam 32 is rotated by means of the operation knob the focusing lens G₁ and the variation lens G₂ are displaced as shown by the arrows x, x₂ in the same way as in the aforementioned case.

In accordance with the present invention, when the optical element of the second group of a zoom lens as mentioned above is displaced distance adjustment and variation can be carried out in the normal photography range and the macrophotography. That is, by means of can be carried out. Namely by means of a very simple construction the normal distance adjustment and the distance adjustment at the time of the macrophotographing can be carried out by means of a continuous cam to be operated with the same knob, which makes the operability very excellent. Further the change over between the normal distance range and the macrophotographing range can be carried out only at a predetermined focal length so that there is no danger of misoperation due to the knob being unwillingly moved.

What is claimed is:

1. A zoom lens structure comprising:
   zoom optics forming an optical axis and including a focusing optical element, a variation optical element and an image forming optical element;
   cam means for moving the focusing optical element along the optical axis for focusing the optics;
   zooming operation means for displacing the variation optical element along the direction of the optical axis for focal length adjustment of the optics;
   means for operatively engaging the zoom operation means with the focusing optical element; and
   compensation means for displacing the focusing optical element so as to compensate for focusing the optics when the focusing optical means in operative engagement with the zooming operation means is rotated relative to the cam means;
   the cam means for moving the focusing optical element forming a first cam range for focusing in a normal photography range and a second cam range for focusing in a macrophotograph range, the zooming operating means having a predetermined variation operation range and a predetermined macrophotography position, the variation optical element and the focusing optical element being connected to each other only at the macrophotography position so as to be displaced along the optical axis in the second cam range of the cam means for macrophotography.

2. A zoom lens structure in accordance with claim 1 further comprising prevention means for preventing the cam means from moving out of the first cam range into the second cam range.

3. A zoom lens structure in accordance with claim 2, wherein operative engagement with the zoom operation means the prevention means assumes a position at which the displacement of the cam means is prevented and another position at which the displacement is allowed.

4. A zoom lens structure comprising:
   zoom optics forming an optical axis and including a focusing optical element, a variation optical element, and an image forming optical element;
   focusing means including a holding member for holding the focusing optical element, a lens barrel for holding the holding member rotatably and movably along the optical axis, a guide member for guiding the lens barrel straight along the optical axis, and cam means for moving the lens barrel along the optical axis,
   said holding member and the lens barrel being connected together with a cam groove and a pin;
   a zoom operation member having means respectively engageable with the variation optical element and the focusing optical element,
   said operation member being arranged for moving the variation optical element by its rotation so as to perform a focal length adjustment of the optics, and for rotating the holding member to move the holding member to perform compensation by operation of the cam groove along the optical axis;
   means for functionally connecting the holding member to the variation optical element; and
   operation means for performing macrophotography, said operation means being arranged for linearly moving the holding member and the variation optical element together along the optical axis in their connected state.

5. A zoom lens structure in accordance with claim 4, wherein the cam means for moving the focusing optical element forms a first cam range for focusing in a normal photography range and a second cam range for focusing in a macrophotography range, the zooming operating means haing a predetermined variation operation range and a predetermined macrophotography position, the variation optical element and the focusing optical element being connected to each other only at the macrophotography position so as to be displaced along the optical axis in the second cam range of the cam means for macrophotography.

* * * * *